(12) United States Patent
Fan

(10) Patent No.: US 9,198,216 B2
(45) Date of Patent: Nov. 24, 2015

(54) WAIT TIMER FOR DELAY TOLERANT TERMINAL

(75) Inventor: Jianke Fan, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 920 days.

(21) Appl. No.: 12/986,405

(22) Filed: Jan. 7, 2011

(65) Prior Publication Data

US 2012/0178436 A1 Jul. 12, 2012

(51) Int. Cl.
*H04W 76/02* (2009.01)
*H04W 4/00* (2009.01)

(52) U.S. Cl.
CPC ............ *H04W 76/027* (2013.01); *H04W 4/005* (2013.01)

(58) Field of Classification Search
CPC ............................ H04W 76/027; H04W 4/005
See application file for complete search history.

(56) References Cited

U.S. PATENT DOCUMENTS

| | | | | |
|---|---|---|---|---|
| 2007/0294577 | A1* | 12/2007 | Fiske | 714/13 |
| 2009/0209278 | A1* | 8/2009 | Narang et al. | 455/522 |
| 2010/0144363 | A1* | 6/2010 | De Rosa et al. | 455/452.1 |
| 2010/0190499 | A1* | 7/2010 | Wu | 455/436 |
| 2010/0302950 | A1* | 12/2010 | Zhao | 370/242 |
| 2012/0063305 | A1* | 3/2012 | Chiu et al. | 370/230 |
| 2012/0082105 | A1* | 4/2012 | Hwang et al. | 370/329 |
| 2012/0094680 | A1* | 4/2012 | Stackelius et al. | 455/452.1 |
| 2012/0117140 | A1* | 5/2012 | Wang et al. | 709/201 |
| 2012/0157033 | A1* | 6/2012 | Ou et al. | 455/404.1 |
| 2012/0176903 | A1* | 7/2012 | Kastenholtz et al. | 370/237 |
| 2012/0207040 | A1* | 8/2012 | Comsa et al. | 370/252 |

OTHER PUBLICATIONS

3GPP TS 36.331 V9.0.0 (Dec. 2010), "$3^{rd}$ Generation Partnership Project; Technical Specification Group Radio Access Network; Evolved Universal Terrestrial Radio Access (E-UTRA); Radio Resource Control (RRC); Protocol Specification" (Release 10), 276 pages.
3GPP TSG RAN WG2 #71, Oct. 11-15, 2010, Xi'an, China, R2-105365, "Extension of Wait Time After RRC Connection Reject", 2 pages.

* cited by examiner

*Primary Examiner* — Mehmood B Khan
(74) *Attorney, Agent, or Firm* — Oblon, McClelland, Maier & Neustadt, L.L.P.

(57) ABSTRACT

The invention provides a method, an apparatus and a computer program for wireless communication. The invention includes setting a wait timer value for a delay tolerant apparatus for wireless communication as a response to an unsuccessful radio resource connection setup procedure, said wait timer delaying the radio resource connection setup procedure and calculating or searching the wait timer value from a table comprising timer data and values corresponding to timer setup information.

18 Claims, 4 Drawing Sheets

| Base Timer | Extension Timer | | | | | | |
|---|---|---|---|---|---|---|---|
| | 5 | 20 | 100 | 500 | 1000 | 10000 | 90000 |
| 1 | 5 | 20 | 100 | 500 | 1000 | 10000 | 90000 |
| 2 | 10 | 40 | 200 | 1000 | 2000 | 20000 | 180000 |
| 3 | 15 | 60 | 300 | 1500 | 3000 | 30000 | 270000 |
| 4 | 20 | 80 | 400 | 2000 | 4000 | 40000 | 360000 |
| 5 | 25 | 100 | 500 | 2500 | 5000 | 50000 | 450000 |
| 6 | 30 | 120 | 600 | 3000 | 6000 | 60000 | 540000 |
| 7 | 35 | 140 | 700 | 3500 | 7000 | 70000 | 630000 |
| 8 | 40 | 160 | 800 | 4000 | 8000 | 80000 | 720000 |
| 9 | 45 | 180 | 900 | 4500 | 9000 | 90000 | 810000 |
| 10 | 50 | 200 | 1000 | 5000 | 10000 | 100000 | 900000 |
| 11 | 55 | 220 | 1100 | 5500 | 11000 | 110000 | 990000 |
| 12 | 60 | 240 | 1200 | 6000 | 12000 | 120000 | 1080000 |
| 13 | 65 | 260 | 1300 | 6500 | 13000 | 130000 | 1170000 |
| 14 | 70 | 280 | 1400 | 7000 | 14000 | 140000 | 1260000 |
| 15 | 75 | 300 | 1500 | 7500 | 15000 | 150000 | 1350000 |
| 16 | 80 | 320 | 1600 | 8000 | 16000 | 160000 | 1440000 |

```
-- ASN1START

RRCConnectionReject ::=            SEQUENCE {
    criticalExtensions             CHOICE {
        c1                             CHOICE {
            rrcConnectionReject-r8             RRCConnectionReject-r8-IEs,
            spare3 NULL, spare2 NULL, spare1 NULL
        },
        criticalExtensionsFuture       SEQUENCE {}
    }
}

RRCConnectionReject-r8-IEs ::=     SEQUENCE {
    waitTime                           INTEGER (1..16),
    nonCriticalExtension               SEQUENCE {}         OPTIONAL    -- Need OP
}

-- ASN1STOP
```

```
RRCConnectionReject-r10-IEs ::= SEQUENCE {
  waitTime         INTEGER (1...N),
noncritical Extension           SEQUENCE {}
}

OR
RRCConnection Reject-r8-IEs ::= SEQUENCE {
  waitTime         INTEGER (1...N),   /* N = 16 for non-delay tolerant UE, N>=1000 for delay tolerant UE*/
noncritical Extension           SEQUENCE {}
```

Fig. 7

WAIT TIMER FOR DELAY TOLERANT TERMINAL

FIELD OF THE INVENTION

The invention relates to wireless communication systems, methods and devices. More specifically, the invention relates to a wait timer for a delay tolerant terminal.

BACKGROUND OF THE INVENTION

Machine Type Communication (MTC) or machine-to-machine (M2M) is also referred to as time controlled smart devices or smart objects. Applications include smart grid, intelligent transportation, environmental efficiency/protection, as well as integration of wireless sensors and sensor networks with cellular networks. M2M enables novel "Smart Services" for service providers and application developers.

When a large number of MTC devices are deployed in a specific area, the network has to face increased load as well as possible surges of MTC traffic. The same area usually contains H2H, human-to-human type devices, and network resources must be allocated to different devices in an efficient manner. MTC devices should not create unnecessary overload to the network; therefore, the network scheduling efficiency and network performance requirements under MTC load need to be solved.

3GPP, 3rd Generation Partnership Project, develops specifications for third generation mobile phone systems, and also from Release 8 (Rel-8) the next generation specifications often referred to as LTE, Long Term Evolution. The 3GPP has initiated a Study Item on RAN Improvements for Machine-type Communications (RAN, Radio Access Network). One proposal is presented in the related document R2-105365, 3GPP TSG RAN WG2 #71, "Extension of Wait Time after RRC Connection Reject".

During a RRC (Radio Resource Control) connection setup procedure a RRC Connection Reject message will be sent to the UE (User Equipment), if the eNB (Evolved Node B) cannot accept the connection request. A Wait Time is introduced to prevent many MTC devices from attempting simultaneous connection requests. This is achieved by sending different Wait Timer values to MTC devices.

MTC devices have been regarded as low priority devices. According to the 3GPP work, MTC devices should be indicated as "Delay Tolerant" devices. According to Rel-8, the wait timer range in LTE is from 1 to 16 seconds, as indicated by the four bit address space in the information element. This would lead to low wait time variation; also MTC devices could utilize much longer wait time than the seconds of Rel-8. Increasing the wait time by linear scaling—for example multiplying the value by 100—would not solve the problem of simultaneous connection requests. This may also cause problems when the network decides on one wait time T1 based on an overload wait time probability for a user equipment UE and has to choose an available value within the wait timer range that is not so close to T1. For example, if the network sets a wait timer value of T1=140 seconds, the closest value would be 100 seconds, which has the minimum delta error of $\Delta=140$ s$-100$ s$=40$ s. This may cause inaccuracy of the wait time settings to the UE's RRC connection request. It may cause several repeat wait time messages to be sent to the UE. Thus, it may reduce the network resource usage efficiency and delay the network overload problem.

SUMMARY

Various aspects of examples of the invention are set out in the claims. According to one aspect of the present invention the invention presents a method, comprising setting a wait timer value for a delay tolerant apparatus for wireless communication as a response to an unsuccessful radio resource connection setup procedure, said wait timer delaying the radio resource connection setup procedure; and calculating the wait timer value from a table comprising timer data and values corresponding to timer setup information. In other words there exists a table lookup procedure from which the actual wait timer value is obtained. The table may comprise any value and it may be calculated from only a simple lookup, i.e. the value is the same as the table mapping procedure results. The calculating may also refer to multiplication or addition, where the numbers may be obtained from the network oriented messaging and from the table values. The unsuccessful radio resource connection setup procedure is for example a RRC connection establishment where the network rejects or releases the connection.

In one embodiment the timer setup information comprises at least two portions, a first portion comprising a first value and a second portion comprising the timer data pointing to said table; and calculating the wait timer value comprises using the first value and the value obtained from said table with the timer data. In this embodiment the information is sent as a single message which may be divided into two portions.

In one embodiment the timer setup information is comprised in a RRC Connection Reject message or a RRC Connection Release message. These messages are sent from the network to the UE or MTC device.

In one embodiment the wait timer value is calculated by multiplying or adding the first value by/to the value obtained from the table. In one embodiment the apparatus for wireless communication is configured to machine-to-machine type communication.

In one embodiment the timer is a T302 timer, configured to wait after the network has rejected the RRC connection establishment. The T302 timer and its functionality are described in specification 3GPP TS 36.331 V10.0.0 (2010-12).

In one embodiment the apparatus for wireless communication is connected to a mobile network and the method comprises sending a delay tolerant indicator from the apparatus for wireless communication to the network; and sending the timer setup information from the network to the apparatus for wireless communication as a response to receiving the delay tolerant indicator. The delay tolerant indicator indicates to the network that the apparatus is a low priority device, a sensor, a MTC device or the like.

In one embodiment of the method the timer setup information comprises at least two portions, a first portion comprising a row index and a second portion comprising a column index pointing to said table; and calculating the wait timer value comprises using the row index and the column index to indicate the wait timer value. In one embodiment the method comprises adding a random value to the wait timer value after receiving the wait timer value at a network attached storage (NAS) layer, wherein the random value is smaller than the wait timer value, and using the result as a final wait timer value.

According to one aspect of the present invention the invention presents an apparatus for wireless communication, comprising a wait timer configured to delay the radio resource connection setup procedure after an unsuccessful connection setup procedure; at least one memory configured to store a table for timer data and values corresponding to timer setup information; and at least one processor configured to calculate the wait timer value from a table comprising timer data and values corresponding to the timer setup information.

In one embodiment the processor is configured to divide the timer setup information into at least two portions, a first portion comprising a first value and a second portion comprising timer data pointing to said table; and the processor is configured to calculate the wait timer value by using the first value and a value obtained from said table with the timer data.

In one embodiment the processor is configured to calculate the timer value by multiplying the first value by the value obtained from the table. In one embodiment the processor is configured to calculate the wait timer value by adding the first value to the value obtained from the table.

In one embodiment the processor is configured to divide the timer setup information into at least two portions, a first portion comprising a row index and a second portion comprising a column index pointing to said table; and the processor is configured to calculate the wait timer value by using the row index and the column index to indicate the wait timer value. In one embodiment the processor is configured to add a random value to the wait timer value after receiving the wait timer value at a network attached storage (NAS) layer, wherein the random value is smaller than the wait timer value, and use the result as a final wait timer value.

According to one aspect of the present invention the invention presents a computer program product comprising a computer-readable medium bearing computer program code embodied therein for use with a computer, the computer program code comprising setting a wait timer value for a delay tolerant apparatus for wireless communications as a response to an unsuccessful radio resource connection setup procedure, said wait timer delaying the radio resource connection setup procedure; and calculating the wait timer value from a table comprising timer data and values corresponding to timer setup information.

In one embodiment calculating the wait timer value comprises using the first value and a value obtained from said table with the timer data.

According to one aspect of the present invention the invention presents a computer readable medium containing a data structure for a wait timer value configured to delay the radio resource connection setup procedure after an unsuccessful connection setup procedure, the data structure comprising timer setup information comprising at least two portions, a first portion comprising a first value and a second portion comprising the timer data pointing to a table comprising timer data and values corresponding to timer setup information.

It is possible to combine one or more of the embodiments and aspects disclosed above to form one or more further embodiments of the invention.

The benefits of the invention are the non-linear scaling of the wait timer, allowing more complex distribution of the wait times and increased granularity.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 7 is an example of a computer program according to a second embodiment.

DETAILED DESCRIPTION OF THE INVENTION

Reference will now be made in detail to the embodiments of the present invention, examples of which are illustrated in the accompanying drawings.

Figure 1:
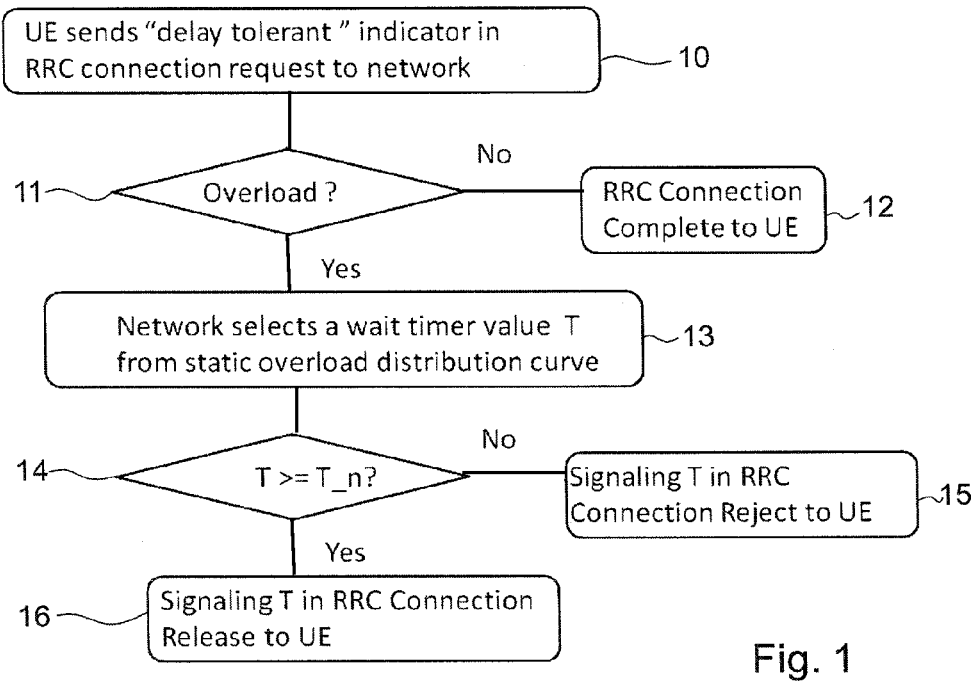
FIG. 1 is a flow chart showing operations related to the wait timer.
Figure 2:
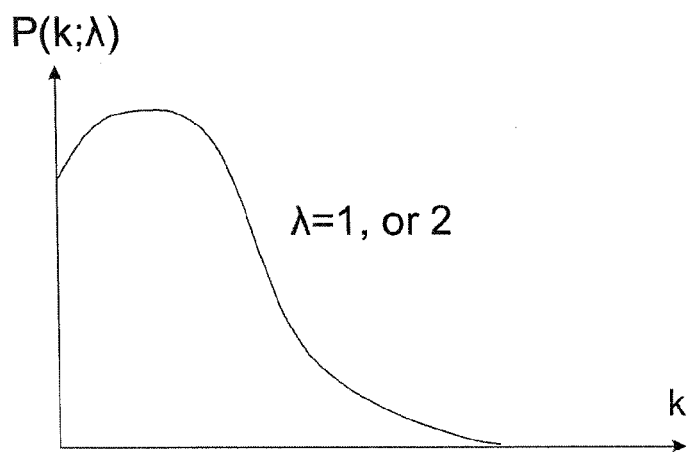
FIG. 2 is an exemplary diagram showing the Poisson distribution diagram used for selecting a wait time.

The present invention relates to Machine-to-machine (M2M) communications and integration of wireless sensors and sensor networks with cellular networks. FIG. 1 is a flow chart illustrating an example embodiment of a wait timer between the network and the user equipment UE or MTC device. The term User Equipment UE refers to an apparatus for wireless communication, a terminal device or a MTC device, device of a sensor network, a PDA or the like. The User Equipment UE sends a delay tolerant indicator in a RRC connection request to the network, block 10. The term "delay tolerant" refers to the user equipment UE being a low priority device, wherefore the operation will not become adversely affected by a possible longer waiting period. The indicator may be any kind of a suitable part of signaling between the user equipment UE and the network EUTRAN, Evolved UMTS Terrestrial Radio Network.

In block 11 it is examined whether the network is facing an overload situation. If the network load is within the normal range, the RRC connection between the network and the user equipment UE is completed, block 12. Otherwise, the network begins selecting a proper wait timer value T from the static overload distribution curve, block 13.

The overload probability distribution follows the Poisson distribution curve with $$f(k; \lambda) = \frac{\lambda^k e^{-\lambda}}{k!},$$

as illustrated in the figure, following the expected recovery time. Also other distribution models than Poisson may be used, as long as the distribution model is suitable for spreading the user equipment UE recovery times. In block 14 it is examined whether the wait timer value T is longer than a timer threshold T_n. For example, if the timer value T is over one hour, it does not make sense to keep the UE at the RRC connected mode or idle connection mode, so the network sends a RRC release message to the user equipment UE to request a release of the RRC connection, block 16. For a moderate or short wait timer case, the network sends a RRC reject message which conveys the wait timer message to the user equipment UE and asks it to try the RRC setup procedure later, block 15.

The wait timer may be transmitted within an information element where the values are looked up from a table. By having a 7-bit information element for the wait timer, it is possible to write 128 different wait timer values. The table values are similar in the network and in the user equipment UE.

Figures 3, 4:
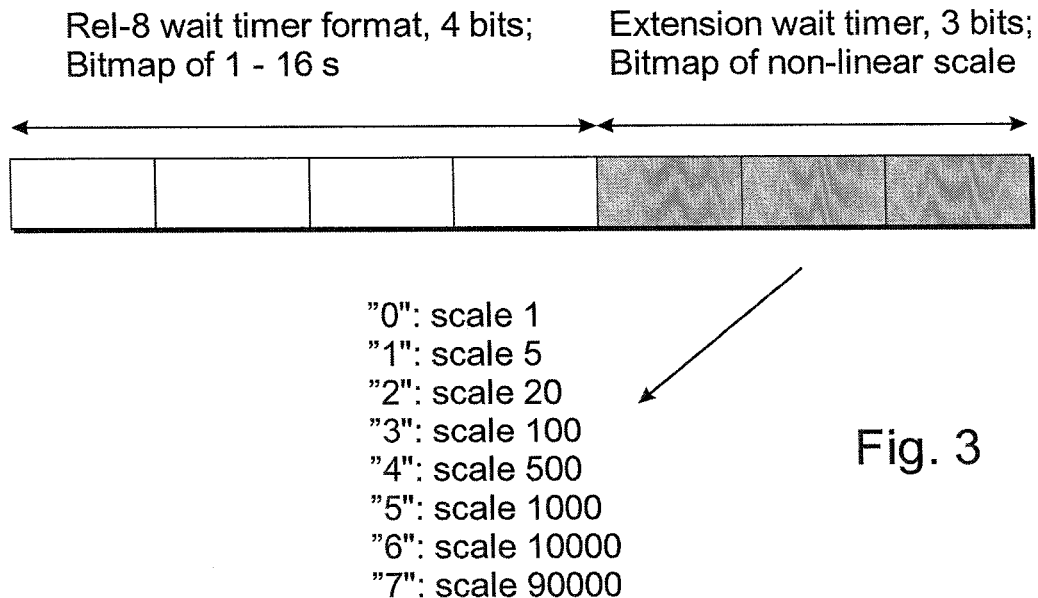
FIG. 3 is an example of a wait timer information element.
FIG. 4 is an example of a look up table comprising wait timer values.

One example of the wait timer structure is shown in FIG. 4. The first portion, a base wait timer, reuses the existing Rel-8 wait timer format, with four bits bitmapping to 1-16 s. The second portion, an extension wait timer, is added at the end of the first portion, with 2 bits or 3 bits depending on the required maximum wait timer range and bitmapping to a non-linear scale. The final wait timer is derived by multiplying the non-linear scale with the base wait timer. If the network detects a delay tolerant indicator in the RRC request message during a network overload problem, the extension wait timer will be activated and, based on the needed wait timer value, the network would select a scale that would provide the closet number to the required wait timer value in the wait timer sequence after multiplying the base wait timer.

In the case of a wait timer as large as 24 h, the maximum number of the wait timer would be 86400 s. The scale can be mapped for example to {1, 5, 20, 100, 500, 1000, 10000, 90000}. This generates the following wait timer strings:

$$\{1, 2, \ldots, 16\} \text{ s}$$
$$\{5, 10, \ldots, 80\} \text{ s}$$
$$\{20, 40, \ldots, 320\} \text{ s}$$
$$\{100, 200, \ldots, 1600\} \text{ s}$$
$$\{500, 1000, \ldots, 8000\} \text{ s}$$
$$\{1000, 2000, \ldots, 16000\} \text{ s}$$
$$\{10000, 20000, \ldots, 160000\} \text{ s}$$
$$\ldots$$

One example of the strings for wait timer values is illustrated in FIG. 4. As the scale is in a non-linear order and provides a non-linear stepsize on the wait timer values, the result is a non-linear scale. For example, if a wait timer value $T_1=140$ s is needed, the network informs the user equipment UE by number 7 in the first portion, the base timer and a scale of 20 in the second portion of the extension wait timer, $T_1=7\times 20=140$ seconds to the user equipment UE. The extension wait timer table provides more random numbers as well as more accurate wait time values than the prior art of a linear scale.

One example to achieve the non-linear stepsize effect is to add these values together. This helps to increase the granularity on the smaller time scale. The information on the required mathematical operation, multiplication or addition may be carried inside the information element from the network to the user equipment UE.

One embodiment is to use the entire information element for the wait timer that is mapping to a table or matrix of for example 128 different wait timer values for seven bits. The wait timer structure contains two portions, the first portion is a column index of the matrix or table and the second portion is a row index of the matrix or table. Therefore, the information that the user equipment UE receives from the network comprises indexes of the non-linear wait timer value $T_1$ in the table. The non-linear wait timer table is stored both in the network and the user equipment UE.

The user equipment UE at the NAS layer may further disperse the wait timer by randomly selecting a number from $[0, T_1]$, where $T_1$ is the received wait timer value from the network, and achieving a final wait timer of $T_1$+random (0, $T_1$). The further disperse randomization could be activated at the user equipment UE when the nonlinear wait timer $T_1$ is large, for example larger than 100 s, and is sent to a group of user equipments UE. This can further improve the granularity of the non-linear wait timer.

Figures 5A, 5B, 6:
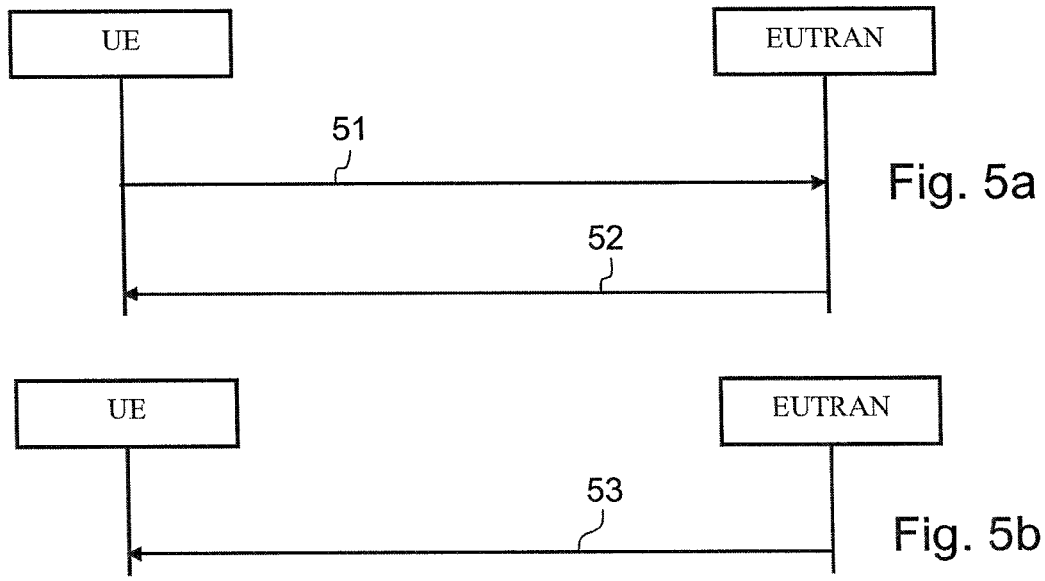
FIGS. 5*a* and 5*b* show the exchange of information elements between the network and the user equipment.
FIG. 6 is an example of a computer program according to one embodiment.

The information flow between the network EUTRAN and the user equipment UE is shown in FIGS. 5a and 5b. The user equipment UE sends an RRCConnectionRequest Information Element to the network EUTRAN, arrow 51. In the network overload situation the network EUTRAN replies by RRCConnectionReject, arrow 52, or by RRCConnectionRelease, arrow 53.

The wait timer information can be transmitted by either RRC connection reject or RRC connection release messages. In the case of the RRC reject message, it could re-use RRCConnectionReject-r8-IEs, Information Elements from Rel-8, and simply extend the waitTime to be a 6-7 bit new waitTime. The range of the wait time depends on the device type. As the wait time range is indicated by an integer N, for a non-delay-tolerant device, N=16 s, otherwise N is larger than 1000 s. The idea is as shown in FIG. 6.

In another embodiment of the invention the wait timer information is transmitted in a new information element. A possible name for such an information element is in the form RRCConnectionReject-rXX-IEs, where rXX is derived from the release number of the specification, for example r10 or r11. The new IE will be added separately to the RRC reject message.

In the embodiment of the RRC release message, the wait timer information can be introduced inside the IE RRCConnectionRelase-r8-IEs by making use of the nonCriticalExtension SEQUENCE{ }. Another embodiment is the information element RRCCconectionRelease-r10-IEs including the waitTime of integer (1 . . . N). This is shown in FIG. 7.

The invention solves or at least alleviates the problems of the prior art; the limited range of wait time and low resolution with a linear wait time scaling factor. The idea of the non-liner scaling wait timer is to signal a new wait timer value to the UE or MTC device using a 6-7 bit signaling message or information element, but it can be made to convey any range of values, and the resolution can be made with the smallest granularity. As the wait timer can be only 6-7 bits but it can convey as many numerical values as needed in the wait time range, the invention can significantly reduce the wait timer overhead signaling at the RRC layer, improving the system resource usage efficiency. The non-linear wait timer values are more accurate than the linear wait timer, which helps to reduce the ping-pong phenomenon in the network—there is no need to repeatedly signal wait time values to UE; thus, it may improve the network resource usage efficiency and effectively reduce the network overload problem.

The first part of the new wait timer can re-use four bits of the wait timer information element as defined in the existing LTE and UMTS specification, and the second part of the wait timer is a mapping table of a non-liner scale. The mapping table can be added to the existing wait timer format as the extension part of the wait timer. The wait timer according to the invention can be used for both LTE and UTMS networks.

It is obvious to a person skilled in the art that with the advancement of technology, the basic idea of the invention may be implemented in various ways. The invention and its embodiments are thus not limited to the examples described above; instead, they may vary within the scope of the claims.

The invention claimed is:

1. A method for setting a wait timer value for a delay tolerant device for wireless communications, the method comprising receiving, by a receiver of the delay tolerant device from a wireless network, a radio resource control (RRC) Connection Reject message or a RRC Connection Release message that indicates an unsuccessful radio resource connection setup procedure, said received message comprising at least a first timer portion and a second timer portion; and calculating, by a processor of the delay tolerant device, the wait timer value for delaying the radio resource connection setup procedure by reading from the first timer portion a first value that maps to a linear series of base wait times, and utilizing the second timer portion to scale the first value non-linearly from the linear series of base wait times; and setting, by the processor of the delay tolerant device, the wait timer value for the delay tolerant device based on said calculating.

2. The method according to claim 1, wherein the first timer portion is a base wait timer comprising a number of bits sufficient to map to any integer timer value from 1 through 1000, and the second timer portion is an extension wait timer.

3. The method according to claim 1, wherein using the second timer portion to scale the first value non-linearly comprises multiplying the first value by a second value obtained from the second portion.

4. The method according to claim 1, wherein using the second timer portion to scale the first value non-linearly comprises adding the first value to a second value obtained from the second portion.

5. The method according to claim 1, wherein the timer is a T302 timer.

6. The method according to claim 1, wherein the delay tolerant device for wireless communication is a machine type communication (MTC) device, the method further comprising, prior to the receiving:

sending from the MTC device, to the wireless network, a delay tolerant indication that the MTC device is a delay tolerant device.

7. An apparatus for setting a wait timer value for a delay tolerant device for wireless communication, the apparatus comprising:

a receiver configured to receive, from a wireless network, a radio resource control (RRC) Connection Reject message or a RRC Connection Release message that indicates an unsuccessful radio resource connection setup procedure, said received message comprising at least a first timer portion and a second timer portion; and a processor configured to calculate the wait timer value for delaying the radio resource connection setup procedure by reading from the first timer portion a first value that maps to a linear series of base wait times, and utilize the second timer portion to scale the first value non-linearly from the linear series of base wait times; and set the wait timer value for the delay tolerant device based on said calculating.

8. The apparatus for wireless communication according to claim 7, wherein the first timer portion is a base wait timer comprising a number of bits sufficient to map to any integer timer value from 1 through at least 1000, and the second timer portion is an extension wait timer.

9. The apparatus for wireless communication according to claim 7, wherein the processor is configured to use the second timer portion to scale the first value by a second value obtained from the second portion.

10. The apparatus for wireless communication according to claim 7, wherein utilizing the second timer portion to scale the first value non-linearly comprises utilizing the second timer portion to add the first value to a second value obtained from the second portion.

11. A computer program product for setting a wait timer value for a delay tolerant device for wireless communications, the computer program product comprising a non-transitory computer-readable medium bearing computer program code embodied therein for use with a computer, the computer program comprising:

code for receiving at the device from a wireless network a radio resource control (RRC) Connection Reject message or a RRC Connection Release message that indicates an unsuccessful radio resource connection setup procedure, said received message comprising at least a first timer portion and a second timer portion; and code for calculating the wait timer value for delaying the radio resource connection setup procedure by reading from the first timer portion a first value that maps to a linear series of base wait times, and utilizing the second timer portion to scale the first value non-linearly from the linear series of base wait times; and code for setting the wait timer value for the delay tolerant device based on said calculating.

12. A computer program product comprising the non-transitory computer readable medium according to claim 11, wherein the first timer portion is a base wait timer comprising a number of bits sufficient to map to any integer timer value from 1 through at least 1000, and the second timer portion is an extension wait.

13. The computer program product comprising the non-transitory computer-readable medium according to claim 11, wherein using the second timer portion to scale the first value non-linearly comprises multiplying the first value by a second value obtained from the second portion.

14. The computer program product comprising the non-transitory computer-readable medium according to claim 11, wherein, using the second timer portion to scale the first value non-linearly comprises adding the first value to a second value obtained from the second portion.

15. The computer program product comprising the non-transitory computer-readable medium according to claim 11, wherein the timer is a T302 timer.

16. The computer program product comprising the non-transitory computer-readable medium according to claim 11, wherein the device for wireless communication is a machine type communication (MTC) device, the computer program further comprising, prior to the receiving:

code for sending from the MTC device, to the wireless network from which the MTC device receives the message, a delay tolerant indication that the MTC device is a delay tolerant device.

17. The apparatus according to claim 7, wherein the timer is a T302 timer.

18. The apparatus according to claim 7, wherein the device for wireless communication is a machine type communication (MTC) device, the processor configured to further, prior to the receiving:

send from the MTC device, to the wireless network from which the MTC device receives the message, a delay tolerant indication that the MTC device is a delay tolerant device.

* * * * *